Patented June 14, 1949

2,473,020

UNITED STATES PATENT OFFICE 2,473,020

FERROCHROMIUM

Hendrik de W. Erasmus, Lewiston, N. Y., assignor, by mesne assignments, to Union Carbide and Carbon Corporation, a corporation of New York No Drawing. Application April 13, 1948, Serial No. 20,852

3 Claims. (Cl. 75—176)

The invention relates to ferrochromium, an alloy of iron and chromium in which the content of chromium preferably is within the range of 65% to 75% but may vary within the broader range of 50% to 90%. More particularly the invention relates to ferrochromium of low-carbon content. The maximum carbon content of low-carbon ferrochromium will vary from 0.06% to 1% or 2% depending upon the particular grade and use. In some instances the carbon content may be as low as 0.01% or lower.

In the present state of the art, ferrochromium of low-carbon content is prepared by a silicon-reduction process. The raw materials employed consist primarily of chromium ore, silicon or a silicon alloy, and fluxing agents. The manufacturing operation is conducted in the molten state, generally in an open-arc electric furnace. The product is tapped and cooled after which a mechanical separation of the metal from the slag is effected, and the ferrochromium is thoroughly cleaned, sized and graded. Low-carbon ferrochromium, prepared as above described, has a bright, almost silvery color, not unlike chromium metal, and possesses a rather coarse crystalline structure. The material in the 70% chromium grade has a density of about 7.3 grams per cubic centimeter.

Ferrochromium of low-carbon content according to the invention is a highly compacted, uniformly porous, strongly cohesive, fine grained, non-friable, coalesced aggregate which is produced in predetermined shape and size in situ in the solid state by the reaction of comminuted ferrochromium of high-carbon content with a suitable oxidant, the reaction preferably being conducted in vacuo. Due to the interstices between the coalesced particles, the material has a lower apparent density than low-carbon ferrochromium produced by a fusion process, a feature which lends definite metallurgical advantage to the new material. In the 70% grade, the apparent density is approximately 6.1 grams per cubic centimeter. Depending upon the composition and amount of porosity, the average density of the material may vary between 5.6 and 6.5 grams per cubic centimeter. The material has a metallic grey color. Fracture surfaces are bright and have a fine-grained appearance as compared with the coarse crystalline structure of fusion-produced low-carbon ferrochromium.

In the production of the low-carbon ferrochromium according to the invention, high-carbon ferrochromium and the selected oxidant are first comminuted to extreme fineness i. e. preferably below 30 microns average particle size and then thoroughly mixed. The amount of oxident used preferably should be in slight excess of that required stoichiometrically to supply the necessary oxygen to react with and remove as gas the carbon from the high-carbon ferrochrome.

After mixing, the charge is pelleted or otherwise converted into compressed form of a shape and size desired in the final product. Pelleting of the charge provides excellent contact between reacting particles and also interstitial space for the escape of reaction gases as well as a convenient form for handling the material. Bonding agents such as chromic acid and water may be employed in the formation of the pellets.

The pellets may be charged into any suitable vacuum furnace and heated in vacuo or under reduced pressure until carbon is eliminated to the desired extent. The preferred temperature range lies above 1150° C. and below the temperature at which the reacting charge fuses.

The following specific example illustrates the manner in which the low-carbon ferrochromium pellets of the present invention are produced: 2120 parts of comminuted high-carbon ferrochromium having approximately the composition:

| | Per cent |
|---|---|
| Chromium | 68.11 |
| Iron | 26.81 |
| Carbon | 4.72 |
| Sulfur | 0.12 |
| Silicon | 1.46 | and 276 parts of comminuted silica rock containing 99% silica were thoroughly mixed with 42 parts of chromic acid and 79 parts of water and compressed into oval shaped pellets approximately 1.25 inches long by 0.875 inch wide by 0.725 inch thick. The pellets were dried, charged into a furnace and heated at a temperature between 1250° C. and 1300° C. at a pressure of about 2 millimeters of mercury absolute for about 25 hours. The final product had the approximate composition:

| | Per cent |
|---|---|
| Chromium | 66.89 |
| Iron | 25.54 |
| Carbon | 0.01 |
| Sulfur | 0.009 |
| Silicon | 6.20 |
| Silica | 1.12 |

The pellets prepared as above described were in a form immediately suitable for use in the production of quality alloy steel without the necessary steps of slag removal and sizing inherent in fusion production methods.

What is claimed is:

1. A highly compacted, uniformly porous, strongly cohesive, fine-grained, non-friable, coalesced aggregate of ferrochromium containing chromium between 50% and 90%, carbon in an amount not exceeding 2%, at least 4% silicon, remainder essentially all iron.

2. A pellet composed of a highly compacted, uniformly porous, strongly cohesive, fine grained, non-friable, coalesced aggregate of ferrochromium containing chromium between 50% and 90%, carbon in an amount not exceeding 1%, at least 4% silicon, remainder essentially all iron, said pellet being further characterized in that its apparent density lies between 5.6 grams and 6.5 grams per cubic centimeter.

3. A pellet composed of a highly compacted, uniformly porous, strongly cohesive, fine grained, non-friable, coalesced aggregate of ferrochromium containing chromium in an amount between 65% and 75%, carbon in an amount between about 0.01% to 0.06%, at least 4% silicon, remainder essentially all iron, said pellet being further characterized in that its apparent density lies between 5.6 grams and 6.5 grams per cubic centimeter.

HENDRIK DE W. ERASMUS.

REFERENCES CITED

The following references are of record in the file of this patent:

UNITED STATES PATENTS

| Number | Name | Date |
|---|---|---|
| 2,170,158 | Rennerfelt | Aug. 22, 1937 |